United States Patent [19]

George

[11] 4,343,396

[45] Aug. 10, 1982

[54] ROLLER CONVEYORS WITH CLUTCH DRIVES

[75] Inventor: Alan L. George, West Northaw, England

[73] Assignee: Dexion-Comino International Limited, Hertfordshire, England

[21] Appl. No.: 146,872

[22] Filed: May 5, 1980

[30] Foreign Application Priority Data

May 14, 1979 [GB] United Kingdom ............... 7916613

[51] Int. Cl.³ .............................................. B65G 13/07
[52] U.S. Cl. ..................................... 198/781; 198/790
[58] Field of Search ............... 198/780, 781, 783, 784, 198/789–791, 460; 192/65, 93 R, 108; 64/30 R, 30 C

[56] References Cited

U.S. PATENT DOCUMENTS

| 2,249,187 | 7/1941 | Steiner | 192/93 R |
| 3,285,391 | 11/1966 | Fix | 198/781 |
| 4,063,636 | 12/1977 | vom Stein | 198/781 |

FOREIGN PATENT DOCUMENTS 1543506 10/1968 France ................ 198/781

*Primary Examiner*—Robert B. Reeves
*Assistant Examiner*—Douglas D. Watts
*Attorney, Agent, or Firm*—Pollock, Vande Sande & Priddy

[57] ABSTRACT

A drivable load-carrying roller assembly comprises a conveyor roller, roller-driving structure at an end of the roller and a clutch disposed at that end for coupling the roller to the driving structure and operable by linear displacement of structure formed on or displaceable with a guard member shielding the said driving structure. The guard member advantageously comprises a plate displaceable in a direction at right angles to the roller and provided with cam structure engageable with one part of the clutch for shifting that part, in the axial direction of the roller, in relation to another clutch part, whereby the coupling of the roller to the driving structure by the clutch is controlled. The said one clutch part may be spring-loaded towards its clutch-engaging position and movable to its clutch-disengaging position by the cam structure or movable towards both its engaging position and its disengaging position by the cam structure.

12 Claims, 8 Drawing Figures

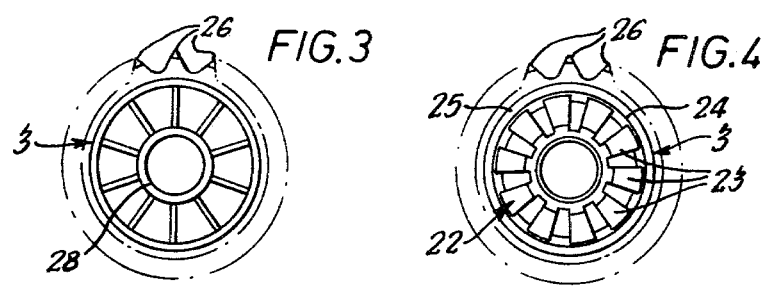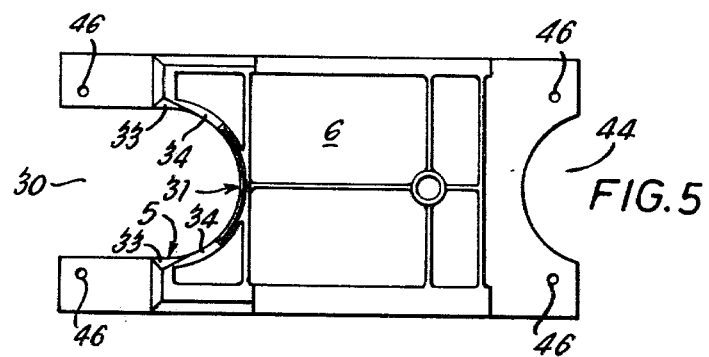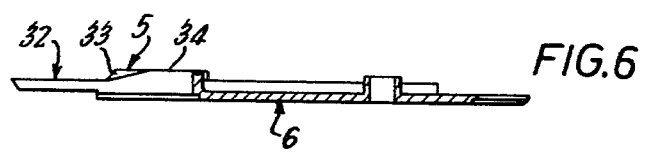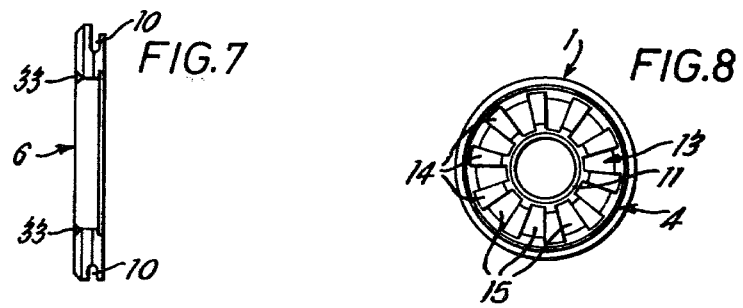

ROLLER CONVEYORS WITH CLUTCH DRIVES

BACKGROUND

This invention concerns improvements relating to drivable load-carrying rollers, particularly rollers for so-called accumulating conveyors. In such conveyors, a usual requirement is that it should be possible for a group or groups of rollers, or individual rollers, to be disconnected from driving means when so required, for example for automatically removing the drive from a group of rollers in dependence upon the detected condition of occupation by a load or loads on a group of rollers downstream from the first-named group and thereby limiting pressure upon that load or loads of following loads. For this purpose, comparatively complex and expensive arrangements have been heretofore proposed. The present invention seeks to provide a simpler arrangement which is also economic and safe.

SUMMARY OF INVENTION

According to the invention, in combination with a conveyor roller and roller-driving means, for example a sprocket wheel driven through a chain or vee belt, at an end of the roller, a clutch provided at that end for coupling the roller to the driving means is operable by linear displacement of means formed on or displaceable with a guard member shielding the said driving means.

In one advantageous embodiment of the invention, the said guard member comprises a plate displaceable in a direction at right angles to the roller and provided with cam means engageable with one part of the clutch for shifting that part, in the axial direction of the roller, in relation to another clutch part, whereby the coupling of the roller to the driving means by the clutch is controlled. The plate may be slidably guided between flanges at the side, towards the roller, of a roller-supporting member which itself shields the driving means on other sides. If the driving means comprises a continuously driven chain, one part of the clutch may be provided with sprocket teeth with which the chain is in driving engagement. The plate may be operatively connected to means disposed to be actuated by a conveyed load.

In a conveyor comprising a plurality of successive such assemblies, plates thereof may be coupled together to move in unison, possibly under the control of one load-actuated means.

BRIEF DESCRIPTION OF DRAWINGS

A preferred embodiment of the invention by way of example will now be more fully described with reference to the accompanying drawings, in which.

DETAILED DESCRIPTION OF PREFERRED EMBODIMENT

Figure 1:
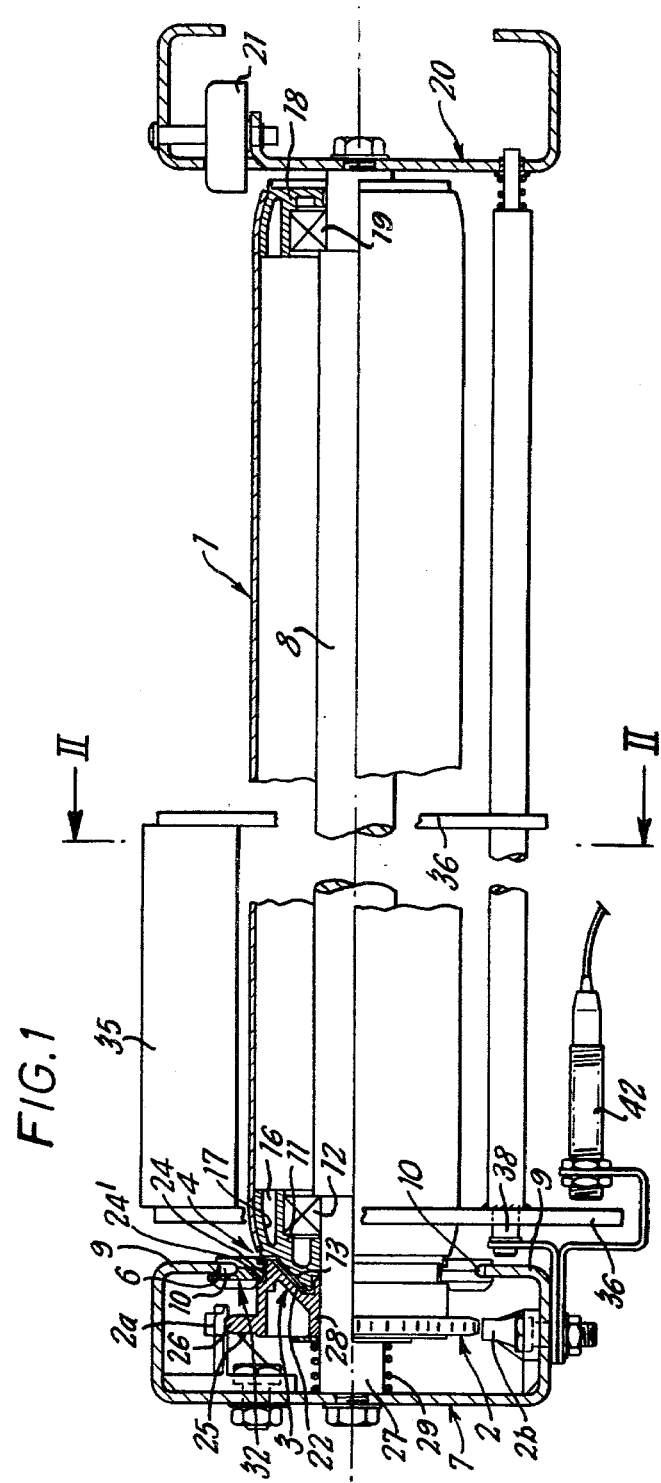
FIG. 1 is a front elevation, partially in vertical section, of a conveyor roller with its associated supporting and driving means, FIG. 2 a section on the line II—II in FIG. 1, showing also two adjacent conveyor rollers, FIG. 3 an outside elevation of a driving sprocket wheel, FIG. 4 an inside elevation of that wheel showing one half of a dog clutch, FIG. 5 an inside elevation of a guard member provided with a cam formation, FIG. 6 a horizontal section through that member, FIG. 7 an end elevation thereof, and FIG. 8 an elevation of the other dog-clutch half, which is fast in the roller.

In the illustrated embodiment of the invention, driving means for a tubular conveyor roller 1 (FIG. 1) comprises a sprocket wheel 2 which is continuously driven through an endless chain (the chain itself is not shown, but elements for guiding upper and lower flights of the chain are indicated at 2a, 2b FIG. 1). The wheel 2 is provided, FIG. 4, with one half 3 of a dog clutch and is slidable axially in relation to a co-acting clutch half 4 fastened in the roller. Axial movement of the wheel 2 for engaging and disengaging the clutch 3, is controlled by a cam formation 5 (FIG. 5) on a face of a guard member 6 slidable, longitudinally of the conveyor, beside the chain on a member 7 which supports a non-rotatable shaft 8 on which both the roller 1 and the sprocket wheel 2 are free to rotate. The support member 7 also serves to enclose and shield the driving means on sides not shielded by the guard member 6. Suitably and as shown, the member 7 is a channel-section beam (FIG. 1) disposed with its open side towards the conveyor and having on that side short vertical flanges 9 on whose edges the member 6 is guided by longitudinal slots 10 in the upper and lower edges of the latter member which, as hereinafter described, is substantially of a plate shape disposed on edge.

The clutch half 4 fast in the roller 1 comprises a hub-like body 11 (FIG. 2) whose axially outer portion has a bore accommodating a journal bearing 12 on the shaft 8 and an end face 13 of frusto-conical form with an apex angle of 90°, for example. Standing proud from this face are a series of sector-shaped lands 14, suitably ten in number, separated by sector-shaped recesses 15 and forming clutch dogs (FIG. 8). The axially inner portion of the body has a cylindrical cavity 16 and an external surface 17 whose axially inner and outer parts are cylindrical and slightly convexly curved respectively. The adjacent end of the tubular roller 1 is swaged tightly over the external surface 17, so that the roller is supported concentrically by the hub body 11, which is held against relative axial and circumferential movement by the roller. At its other end, the roller 1 is similarly swaged over a simple hub body 18 accommodating the bearing 19 on the shaft 8 whose projecting extremity is fixed in the vertical web of a second beam 20, suitably of the same channel section as the beam 7. The beam 20, whose outwardly-open side may be closed by a panel (not shown), suitably serves also to support a series of article-guiding rollers 21 rotatable about vertical axes.

The clutch half 3 associated with the wheel 2 also comprises a hub-like body whose inner end face 22 is of open frusto-conical form complementary to that described for the end face 13 of the clutch half 4 and is provided with complementary clutch dogs 23 (FIG. 4). Radially outside this clutch portion, the body has a cylindrical part 24 stepped radially outwardly so that there is a robust annular part 25 which is formed with the sprocket teeth 26, suitably seventeen in number with a pitch-circle diameter of about 3 inches and a pitch of ⅝ inch, engaged from below by a guided flight of the chain (not shown). The latter may be a simple roller chain of commercially available type. The body of the clutch half 3 has a bore, freely rotatable and slidable axially on the reduced end 27 of the shaft 8, which extends through an outwardly directed co-axial sleeve portion 28 integral with the body. A helical compression spring 29 (FIG. 1) located over the shaft part 27 bears at one end against the clutch half 3 and is abutted at the other end against the adjacent beam member 7.

The plate-shaped guard/cam member 6 (FIGS. 5 and 6) has a horizontally elongated opening 30 with a semi-circular end 31, by which it is disposed with clearance over the cylindrical part 24, of the clutch half 3, its outer face 32 adjoining, with clearance, a shoulder $24^1$ formed by the step beyond the aforesaid part 24. At a position adjacent to the vertical line through the centre of the semi-circular end 31 of the opening 30, the plate member 6 is provided, on the side towards the shoulder, with the cam formation 5 which is interrupted by the opening. Seen in plan view (FIG. 6), this formation comprises an inclined section 33 rising gently in the direction normal to the plate member 6 followed by a level land 34. The cam formation may be self-centring, as shown, or a plain cam formation.

In the normal position of the member 6, in which the cam formation 33, 34 is not in engagement with the shoulder $24^1$, the clutch 3, 4 is maintained engaged by the action of the spring 29 urging the axially slidable chain-driven clutch half 3 into driving engagement with the clutch half 4 fast in the roller, If, however, the member 6 is shifted longitudinally to bring the land 34 of the cam formation against the shoulder $24^1$, the driven clutch half 3 is displaced, against the spring, away from the roller clutch half 4, so that the clutch becomes disengaged and the roller 1 undriven. On shifting of the member 6 in the opposite direction, clutch engagement and roller drive are automatically re-established by the action of the spring 29. This could be achieved or assisted by a second cam face on the plate 6 which would be arranged positively to move the clutch half 3 in the engaging direction. In this case, the spring 29 could be dispensed with. In one arrangement of this nature, the shoulder $24^1$ on the plate 6 is replaced by a collar providing two cam-reaction faces and each cam formation 33, 34 by a cam groove affording two cam faces, one for shifting the clutch half 3 in the direction for disengagement from the clutch half 4 and the other for shifting the former clutch half in the engaging direction. End sections of the cam groove have faces, offset in relation to each other in the direction of the thickness of the plate 6, extending parallel to the plate, which faces are connected by inclined, somewhat staggered, cam faces for producing the respective shift movements of the clutch half 3. Upper and lower marginal portions of the plates are each made thick enough to accommodate the groove.

Figure 2:
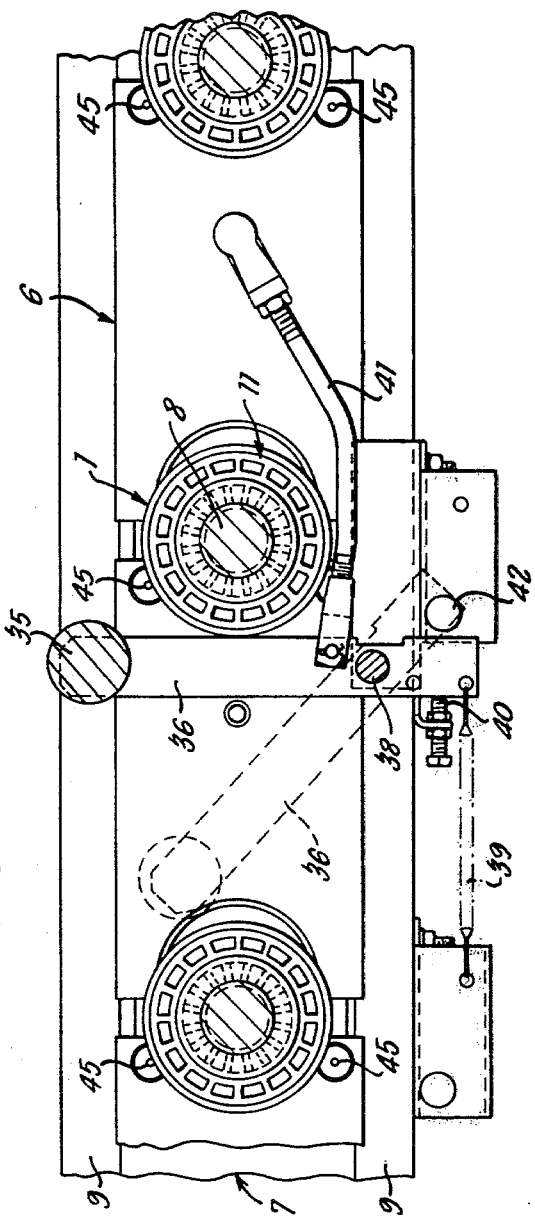

The longitudinal shift of the plate 6 may be effected by or under the control of load-sensing means, for example known such means responsive to the condition of loading of a section of conveyor downstream of the roller 1 whose drive is controlled. An arrangement for this purpose is illustrated in FIGS. 1 and 2. A load-detection cylinder or roller 35 extending across at least part of the conveyor path defined by the tops of the rollers 1 is supported at the upper ends of levers 36 which are pivotally mounted on a rod 38 supported from the beams 7, 20 and are loaded by a tension spring 39 towards a normal upright position (illustrated in full lines in FIG. 2) against an adjustable stop 40. On the passage of a load beyond the adjacent conveyor roller 1, however, the cylinder 35 is depressed by the load so that the levers 36 assume the position shown in broken lines in FIG. 2, whereby a longitudinal movement to the left is imparted to the plate 6 through a bent link 41, and the cam formation 33, 34 causes the clutch 3, 4 to be disengaged, so that the roller 1 is disconnected from the drive. When the cylinder 35 is no longer held depressed by the presence of the load, the parts resume the positions shown in full lines in FIG. 2 and the clutch 3, 4 is re-engaged by the action of the spring 29 (FIG. 1), so that the roller 1 is again driven. Various methods of control of the rollers 1 of a conveyor, either singly or in groups and with or without over-riding manual or automatic control to meet particular requirements, especially those of so-called accumulating conveyors, can thereby be achieved. Means for transmitting signals for control or supervision purposes may be associated with the apparatus described above. By way of example, the presence of a load, as indicated by the position of the levers 36, may be monitored by a magnetic or other proximity sensor device 42 (FIG. 1) mounted beside the path of movement of the lower end of one lever 36 (FIG. 2).

For the sake of explanation, it has been assumed that it is a single roller 1 that is controlled by a cam/guard plate 6. Commonly, however, it will be desirable or necessary to control a number of rollers, which may form a group, in unison. For this purpose a number of plates 6 may be coupled together, each with a cam formation 33, 34, a part opening 30 at one end of each plate being completed by a complementary opening at the other end of the next plate, or a single long plate may be provided with openings and cam formations for a number of rollers. By such arrangements, provision may be made for the controllable driving of any number of rollers by a direct power-transmitting means. The drive may be arranged to be removable from any required number of rollers and for any required period.

The form of plate 6 illustrated in FIGS. 2, 5 and 6 is suitable for use where a number of such plates are to be coupled together. At the end opposite to the opening 30, each plate 6 has an opening 44 complementary to the semi-circular part 31 of the opening 30. Successive plates 6 are coupled by pins 45 (FIG. 2) passed through holes 46 (FIG. 5) in overlapped end portions of the plates. In the coupled condition of two plates 6, an elongated opening with semi-circular ends is formed by part of the opening 30 in one plate and the opening 44 in the adjoining plate. FIG. 2 illustrates a portion of a conveyor showing three rollers 1 and associated plates 6 which will all be moved in unison to actuate respective clutches 3, 4 of the rollers 1 under control, in the example illustrated, of the single assembly of components 35 to 41. The plates 6 by bridging the gap between the flanges of the beam 7 complete the enclosure of the roller-driving means, including the chain and sprocket teeth and, if desired, the sprocket-wheel drive input to the chain from a motor. There need be no necessity for additional guarding means for any length of power-driven roller conveyor.

Other kinds of clutches, apart from clutches with other forms of co-acting dogs or teeth, may be employed. The clutches may or may not be designed to slip under overload or should a person be trapped by any rollers. Also other power-transmitting means may be employed.

Suitably the hub-like clutch members 3, 4 may be made from a plastics material such as nylon. They may each be produced, including cutting of the sprocket teeth, by machining a blank body of the plastics material with a high accuracy of concentricity. Alternatively press-in bushes of P.T.F.E. may be fitted at bearing locations in hub-like bodies. The plates may also be made of a plastics material, but any of these components may be made of metal.

What is claimed is:

1. A drivable load-carrying roller assembly comprising, in combination with a conveyor roller and roller-driving means at an end of the roller, a clutch disposed at that end for coupling the roller to the driving means, a support member for supporting the roller at that end and having flanges at the side towards the roller, a plate member slidably guided between the said flanges for linear displacement in a direction at right angles to the roller and constituting a guard shielding the driving means on that side, which driving means is shielded on other sides by the said support member, the plate member being provided with cam means operative, on said displacement of the plate member, for shifting one part of the clutch in the axial direction of the roller in relation to another part of the clutch for controlling the coupling of the roller to the driving means.

2. A drivable load-carrying roller assembly comprising, in combination with a conveyor roller and a roller-driving means, clutch means disposed at an end of said conveyor roller for coupling said conveyor roller to said roller-driving means; said load-carrying roller assembly further comprising a support member supporting said conveyor roller end, said support member having spaced flanges extending toward said conveyor roller end, with a guard plate slidably mounted between said spaced flanges for linear displacement wherein said guard plate shields said roller-driving means from said conveyor roller, said roller-driving means being further shielded on further sides by said support member; said guard plate having operative means for selectively altering the position of said clutch means during sliding of the plate to facilitate coupling of said conveyor roller to said roller-driving means.

3. An assembly according to claim 2, wherein said guard plate is disposed for linear displacement in a direction extending at right angles to said conveyor roller, and said operative means comprises cam means formed on and displaceable with said guard plate for engaging and shifting one part of said clutch means relative to a further part of said clutch means, wherein said cam means displaces said one clutch part in an axial direction of said conveyor roller.

4. An assembly according to claim 3, wherein said one clutch part is spring-loaded towards its clutch-engaging position with said further clutch part and is selectively movable to its clutch-disengaging position by operation of said cam means.

5. An assembly according to claim 3, wherein said one clutch part is movable towards at least its clutch-disengaging position by operation of said cam means.

6. An assembly according to claim 3, wherein the driving means comprises a continuously driven chain and said one clutch part is provided with sprocket teeth engageable with said driven chain.

7. An assembly according to claim 3, wherein said further part of said clutch means is rigidly attached to the conveyor roller.

8. An assembly according to claims 2 or 3, wherein the clutch means comprises a dog clutch having co-acting parts of complementary frusto-conical configuration.

9. An assembly according to claim 2, wherein the guard plate is operatively connected to means disposed for actuation by a conveyed load.

10. A conveyor comprising a plurality of roller assemblies according to claim 3, wherein guard plates of successive roller assemblies are coupled together to move in unison.

11. A conveyor according to claim 10, wherein the guard plates on successive roller assemblies have openings in each end which, when adjacent members are coupled together, define an aperture through which said one clutch part passes, which aperture permits displacement of the guard plate for shifting said one clutch part.

12. A conveyor according to claim 11, wherein a plurality of guard plates are operatively connected to a load-actuated means.

* * * * *